US012611596B2

(12) United States Patent
Monti et al.

(10) Patent No.: US 12,611,596 B2
(45) Date of Patent: Apr. 28, 2026

(54) CONTENT PREPARATION DEVICES AND METHODS

(71) Applicant: Sony Interactive Entertainment Inc., Tokyo (JP)

(72) Inventors: Maria Chiara Monti, London (GB); Oliver Hume, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 287 days.

(21) Appl. No.: 18/339,346

(22) Filed: Jun. 22, 2023

(65) Prior Publication Data

US 2024/0001227 A1     Jan. 4, 2024

(30) Foreign Application Priority Data

Jun. 29, 2022     (GB) ..................................... 2209506

(51) Int. Cl.
  *A63F 13/26*       (2014.01)
  *A63F 13/537*      (2014.01)
(52) U.S. Cl.
  CPC ............ *A63F 13/26* (2014.09); *A63F 13/537* (2014.09)
(58) Field of Classification Search
  CPC ........................... A63F 13/26; A63F 2300/537
  See application file for complete search history.

(56) References Cited

U.S. PATENT DOCUMENTS

| | | | | |
|---|---|---|---|---|
| 10,063,653 | B2 * | 8/2018 | Balakrishnan | ........ H04L 67/306 |
| 11,805,467 | B2 * | 10/2023 | O'hare | ................. H04W 40/20 |

| | | | | |
|---|---|---|---|---|
| 2003/0195932 | A1 * | 10/2003 | Tanabe | .................... H04L 63/08 |
| | | | | 709/205 |
| 2004/0181579 | A1 * | 9/2004 | Huck | ..................... G06Q 10/10 |
| | | | | 709/248 |
| 2005/0246283 | A1 * | 11/2005 | Gwiazda | ................ G06Q 10/10 |
| | | | | 705/52 |
| 2007/0203719 | A1 * | 8/2007 | Kenagy | .............. H04L 63/0428 |
| | | | | 705/26.1 |
| 2008/0215581 | A1 * | 9/2008 | Messing | ................ G06Q 30/02 |
| 2008/0253564 | A1 * | 10/2008 | Kahn | ................. H04N 21/4405 |
| | | | | 725/63 |

(Continued)

FOREIGN PATENT DOCUMENTS

EP         4300981  A1     1/2024

OTHER PUBLICATIONS

Combined Search and Examination Report for corresponding Application GB2209506.1, 8 pages, dated Nov. 15, 2022.

(Continued)

*Primary Examiner* — Steve Rowland
(74) *Attorney, Agent, or Firm* — Fish & Richardson P.C.

(57)          ABSTRACT

A method for preparing content includes: detecting a plurality of devices; detecting one or more properties in relation to the plurality of devices; identifying a first subset of the plurality of devices in dependence upon one or more of the detected properties, in which a subset of the plurality of devices comprises one or more devices from the plurality of devices; identifying a first set of one or more components of content in dependence upon the first subset of the devices; and transmitting a respective component of the first set of identified components to a respective device of the first subset of the devices for output by the respective device.

20 Claims, 4 Drawing Sheets

(56) References Cited

U.S. PATENT DOCUMENTS

| | | | |
|---|---|---|---|
| 2009/0198833 A1* | 8/2009 | Kisel ..................... | H04L 67/306 |
| | | | 709/242 |
| 2010/0053069 A1* | 3/2010 | Tricoukes ............. | G06F 3/1431 |
| | | | 345/1.3 |
| 2012/0191783 A1* | 7/2012 | Yang ....................... | H04L 67/63 |
| | | | 709/204 |
| 2014/0006496 A1 | 1/2014 | Dearman | |
| 2014/0047487 A1 | 2/2014 | Guedalia | |
| 2014/0351271 A1* | 11/2014 | Fairchild-Coppoletti | ................... |
| | | | G06Q 10/10 |
| | | | 707/749 |
| 2017/0126636 A1* | 5/2017 | Lor ......................... | H04L 63/08 |
| 2018/0092143 A1* | 3/2018 | Gogineni .............. | H04W 76/10 |
| 2018/0147488 A1* | 5/2018 | Tang ..................... | A63F 13/422 |
| 2019/0138182 A1* | 5/2019 | Kropivny ................ | A63F 13/00 |
| 2019/0273801 A1* | 9/2019 | Luft ................... | H04L 67/1097 |

OTHER PUBLICATIONS

Communication pursuant to Article 94(3) EPC for corresponding EP Application No. 23178224.4, 6 pages, dated Mar. 26, 2025.
1 Examination Report for corresponding GB Application No. 2209506.
1, 6 pages, dated Sep. 2, 2024.
Extended European Search Report for corresponding EP Application No. 23178224.4, 9 pages, dated Oct. 19, 2023.

* cited by examiner

CONTENT PREPARATION DEVICES AND METHODS

BACKGROUND OF THE INVENTION

Field of Invention

The present invention relates to content preparation devices and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Over the years, the types of content available to a user has increased. For example, in the past, audio content may have been available to users before the development of moving image content, which is now also available to users. One type of content that has become increasingly popular is interactive content, which is content that is responsive to a user input such as video games.

Meanwhile, whilst the types of content available to a user has expanded, the variety of devices capable of reproducing content and the types of content reproducible by individual devices has likewise increased. For example, in the past, a user may have possessed one device for reproducing audio content such as an MP3 player and another device for playing handheld video games. However, in recent times, many users may possess a smartphone for example, which is capable of reproducing audio, image and video game content. Moreover, a user will also now often possess many different types of devices that are similarly able to reproduce a wide variety of types of content. Examples of such devices include smartwatches, smart televisions (smart TVs), smart fridges, personal computers, video game consoles, and tablet displays.

Due to the variety of the types of content and devices that are now available to users, it is desirable to provide systems and methods for preparing content so that the content may be provided to a user across a subset of the user's devices to advantageously increase the flexibility of how content may be consumed by a user.

It is in this context that the present disclosure arises.

SUMMARY OF THE INVENTION

In a first aspect, a method for preparing content is provided in claim 1.

In another aspect, a content preparation device is provided in claim 15.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
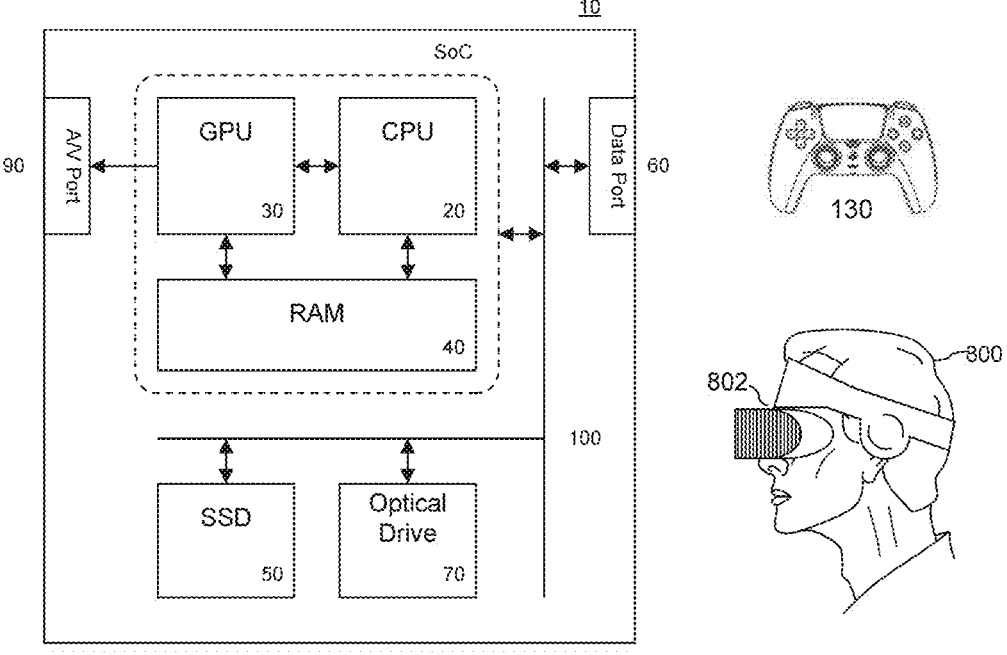
FIG. 1 schematically illustrates an example entertainment system.

Referring now to the drawings, wherein like reference numerals designate identical or corresponding parts throughout the several views, in FIG. 1 an example of an entertainment system 10 is a computer or console such as the Sony® PlayStation 5 ® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 130, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800. Alternatively or in addition, a TV or monitor may be used.

Previously, content would typically be output by one device at a time. Additionally, in a case where content is output by multiple devices, such as a social screen for virtual reality (VR) where content is displayed by both a head mounted display (HMD) and an external display device such as a TV, the same content is displayed by both devices.

In some cases, multiple devices may be used by one application such as applications that make use of a plurality of smartphones as a controller or input device. In these cases, each user will be using a different device to display content. However, in these cases, only one type of device may be used and the type of content displayed on each device is not modifiable, as applications are designed for a specific type of device, such as controllers (smartphones)

and one external display monitor or TV for example. A similar caveat applies to using multiple monitors on a PC.

Therefore, there is a need to provide a user with a content preparation method and device that may advantageously enable at least a portion of content to be prepared for output by at least a subset of a plurality of (typically different) devices in dependence upon at least one or more properties relating to the plurality of devices.

Figures 2A, 2B, 2C:
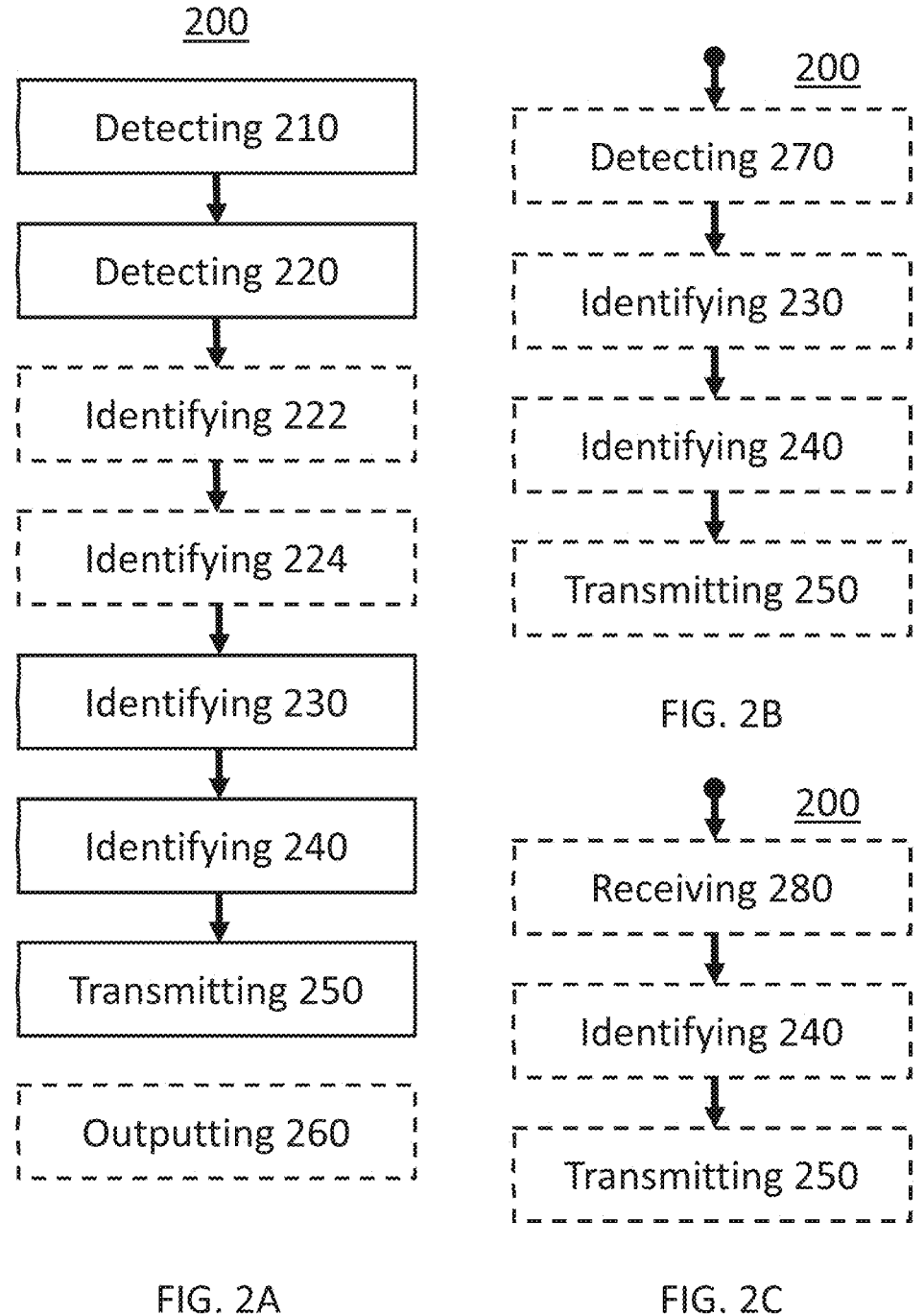
FIGS. 2A, 2B and 2C schematically illustrate an example method.

Accordingly, turning now to FIG. 2, in an embodiment of the present description, a method 200 for preparing content is provided. It is noted that the dotted outlines of some of the features in FIGS. 2A, 2B, 2C and 4 indicate that these features are optional features.

The method 200 comprises the steps of detecting 210 a plurality of devices; detecting 220 one or more properties in relation to the plurality of devices; identifying 230 a first subset of the plurality of devices in dependence upon one or more of the detected properties, in which a subset of the plurality of devices comprises one or more devices from the plurality of devices; identifying 240 a first set of one or more components of content in dependence upon the first subset of the devices; and transmitting 250 a respective component of the first set of identified components to a respective device of the first subset of the devices for output by the respective device.

For example, the plurality of devices may be detected by detecting visible devices on one or more networks such as a local area network (LAN), personal area network (PAN), wide area network (WAN) or the internet. Additionally, one or more of the devices may be detected in dependence upon being previously visible over the networks, even if the previously visible devices are not currently discoverable via the networks. This may enable a reduction in the time required to identify a subset of the devices and a set of components in response to a previously visible and non-discoverable device becoming visible/discoverable over one of the networks.

In some embodiments, the one or more detected properties may comprise one or more properties selected from the list consisting of:

i) a connection status of one or more of the plurality of devices;

ii) one or more user preferences identifying one or more of the plurality of devices;

iii) a proximity of the user to one or more of the plurality of devices;

iv) a screen size of one or more of the plurality of devices;

v) a display resolution of one or more of the plurality of devices;

vi) one or more types of input controls present on one or more of the plurality of devices;

vii) a gaze direction of the user;

viii) a field of view of the user; and ix) one or more types of output present on one or more of the plurality of devices.

The one or more properties may be detected in many ways. For example, one or more of the detected properties may be broadcast by one or more of the devices, such as a respective one of the devices broadcasting one or more device properties of the respective device. Alternatively, or in addition, one or more of the detected properties may be detected by using a respective device's name or hardware identifier to consult a database, which may be stored locally or accessed over a network, where the database may comprise one or more device properties for one or more types of device. In the case where one of the properties is a gaze direction or field of view of the user, a gaze tracking camera may be used to detect the gaze direction or field of view of a user.

In some embodiments, a first subset of the plurality of devices may be identified in dependence upon at least one of the one or more detected properties. An identified subset of devices is the subset of devices from the plurality of devices that are intended to output a component of the content. For example, in a case where one of the detected properties is a gaze direction or a field of view of a user, the first subset of the plurality of devices may be identified in dependence upon whether the proximity of a respective one of the devices from the gaze direction of the user is less than a predetermined threshold or whether a respective one or the devices is within the field of view of the user.

Alternatively, or in addition, a connection status of a one or more of the plurality of devices may be used to identify the first subset of devices. For example, devices with a poor or unstable connection may be excluded from, or less likely to be included in, the first subset, whilst devices with a strong and stable connection may be included in, or less likely to be excluded from, the first subset.

Alternatively, or in addition, the types of input controls, if any, available at a respective one of the devices may be used in identifying whether to include the respective device within the first subset. However, this detected property may be advantageously combined with one or more other detected properties relating to the plurality of devices. For example, the types of input controls, if any, available at a respective one of the devices may be considered alongside a proximity of a user to the respective device.

For example, consider a case where it is desirable to identify, from a set of ten devices, a subset comprising three of the ten devices, and it is desirable for the three devices in the subset to have a particular type of input control type, such as a touchscreen. In this example, seven of the ten devices comprise a touchscreen. However, some of these devices may be out of reach of the user, where the touchscreen controls may not be accessible to the user at the user's current position. Therefore, the three devices that comprise a touchscreen that are closest to the user may be identified as the subset of devices. This is advantageous as it is more likely that the user will be able to access the input controls of the devices identified to be included in the subset.

In some embodiments, as shown in FIG. 2B the method 200 may further comprise the steps of detecting 270 a change to one or more of the detected properties; and in response to detecting the change to one or more of the detected properties: identifying 230 a second subset of the devices in dependence upon one or more of the changed properties, and identifying 240 a second set of components in dependence upon the identified second subset of the devices; and transmitting 250 a respective component of the second set of identified components to a respective device of the second subset of the devices for output by the respective device.

For example, a connection status of a particular one of the devices, which is not included in first subset, may change from having a poor or unstable connection to having a strong and stable connection. In response to this change, a second subset may identified, in which the second subset comprises the particular device not included in the first subset. A second set of components may be identified in dependence upon the identified second subset of the devices; and a respective component of the second set of identified components may be transmitted to a respective device of the second subset of the devices for output by the respective device, as described elsewhere herein.

As another example, the gaze direction of a user may change so that a device that was previously not visible to a user becomes visible to a user. In this case, a second subset of devices may be identified, in which the device that was previously not visible to the user is included in the second subset.

Optionally the threshold relating to a property used for including a device in the subset may be higher once a subset has already been chosen and provided to the user, so that the user only experiences changes to the user interface experience when the overall benefit to them outweigh any inconvenience brought about by the change. Any such modifications in thresholds may be determined empirically. Hence in the case of a connection status, a small improvement in connection may not warrant a change of device subset. By contrast, one device coming into view whilst another falls out of view may clearly meet such a threshold and trigger a change of device set composition.

Alternatively, or in addition, as shown in FIG. 2C, the method may further comprise the steps of receiving 280 a user input identifying a third subset of the devices; identifying 240 a third set of components in dependence upon the identified third subset of the devices; and transmitting 250 a respective component of the third set of identified components to a respective device of the third subset of the devices for output by the respective device.

For example, a user may select a predefined subset of devices from a plurality of subsets of the devices, which may have a corresponding plurality of predefined sets of components of content. Alternatively, or in addition, the user input may identify the third subset of the devices by identifying 230 one or more devices from the plurality of devices, in which the third subset of the devices consists of the one or more devices identified by the user input.

In some embodiments, a first set of one or more components of content may be identified in dependence upon the identified first subset of devices.

In some cases, a plurality of sets of one or more components of content may be predefined, by a creator of the content or a user for example, for a plurality of combinations of device types. In these cases, a respective set of components of the content may be associated with a respective combination of device types.

A device type may categorise particular devices. For example, device types may include smartphones, tablets, portable came consoles, televisions, headphones, speakers, smartwatches, HMDs, external displays or any other suitable category of device type. Alternatively, or in addition, a device type may identify properties of a device that are described elsewhere herein, or may identify a manufacturer and/or a model of a device.

Additionally, a respective component of a set of one or more components of content may be identified in dependence upon one or more characteristics of a respective device of a corresponding subset of the devices. For example, the one or more characteristics of a respective device may comprise one or more characteristics selected from the list consisting of:

i) a screen size of the respective device;

ii) a display resolution of the respective device;

iii) a user preference identifying the respective device; and iv) one or more types of input controls present on the respective device.

The one or more characteristics of a respective device may be detected in a similar way to the detection of the one or more properties relating to the plurality of device as described elsewhere herein.

As an example, a first predefined set of one or more components of content may be predefined for a first combination of device types, which, in this example, may consist of a smartphone, a television and a smartwatch, a second predefined set of one or more components of the content may be predefined for a second combination of device types, which may consist of two smartphones and an external display, and other sets of components of the content may be predefined for other combinations of device types. Therefore, when a subset of devices that comprises a smartphone, a television and a smartwatch (i.e. the devices in the first combination of device types) is identified, the first predefined set of one or more components of the content may be identified in dependence upon the identified subset of devices. Similarly, when a subset of devices that comprises two smartphones and an external display (i.e. the devices in the second combination of device types) is identified, the second predefined set of one or more components of the content may be identified in dependence upon the identified subset of devices.

Therefore, optionally, in some embodiments, the step of identifying 240 the first set of components may comprise the steps of identifying 222 a plurality of subsets of the plurality of devices; identifying 224 a plurality of sets of one or more components of the content in dependence upon the plurality of subsets of the devices, in which a respective set of the plurality of sets of components may be identified in dependence upon a respective subset of the plurality of subsets of the devices, in which the respective set of components may correspond to the respective subset of the devices; and identifying 230 the first subset of the devices from the plurality of subsets of the devices in dependence upon one or more of the detected properties, and identifying 240, from the plurality of sets of components, the first set of components corresponding to the identified first subset of the devices.

Alternatively, or in addition, a set of one or more components of the content may be identified in dependence upon the identified first subset of the devices and one or more characteristics of the content. The one or more characteristics of the content may comprise one or more characteristics selected from the list consisting of:

i) a type of content;

ii) an interactivity level of one or more portions of the content; and iii) one or more input controls required by one or more portions of the content.

Content types may include video games, which may be further categorised into genres such as strategy, shooter or role-playing games, video such as films or TV programs, webpages, which may comprise text and/or images, audio such as music, or any other suitable type of content.

As an example, if the content is a webpage of a news article comprising text and images, one component of a set of one or more components may be identified as the text, which may be transmitted to phone for example, and another component may be identified as the images, which may be transmitted to an external display like a TV.

As another example, if the content is a video game comprising a heads-up display (HUD), one component of a set of one or more components may be identified as the HUD, subtitles may be identified as a second component, and the remaining portions of the video game may be identified a third component.

Alternatively, or in addition, a set of one or more components of the content may be identified in dependence upon the identified first subset of the devices and one or more characteristics of the content by using the techniques of predefining components of content that are described elsewhere herein.

An interactivity level of a portion of content may, for example, be defined as "interactive" when a user input can directly modify the portion of content, or "non-interactive" when a user input may not directly modify the portion of content even if the "non-interactive" portion of content may be responsive to a modification of an "interactive" portion of content caused by a user input. Additionally, an "interactive" portion of content may be further categorised in dependence upon how many, or what type of, user input controls may modify the portion of content. Therefore, each component in a set of components of content may correspond to a portion of the content having a different interactivity level to the other portions of the content. This also provides an example of one or more characteristics of the content comprising one or more input controls required by one or more portions of the content Optionally, a respective component of the set may be identified as corresponding to a respective device of the subset of devices in dependence upon the interactivity level of the respective component and the input control types of the respective device.

In some embodiments, components of the content may comprise one or more components selected from the list consisting of:

i) one or more interactive user interface (UI) elements;
ii) one or more non-interactive user interface (UI) elements;
iii) one or more types of audio;
iv) one or more user notifications;
v) one or more portions of textual information; and
vi) one or more images.

Figure 3A:
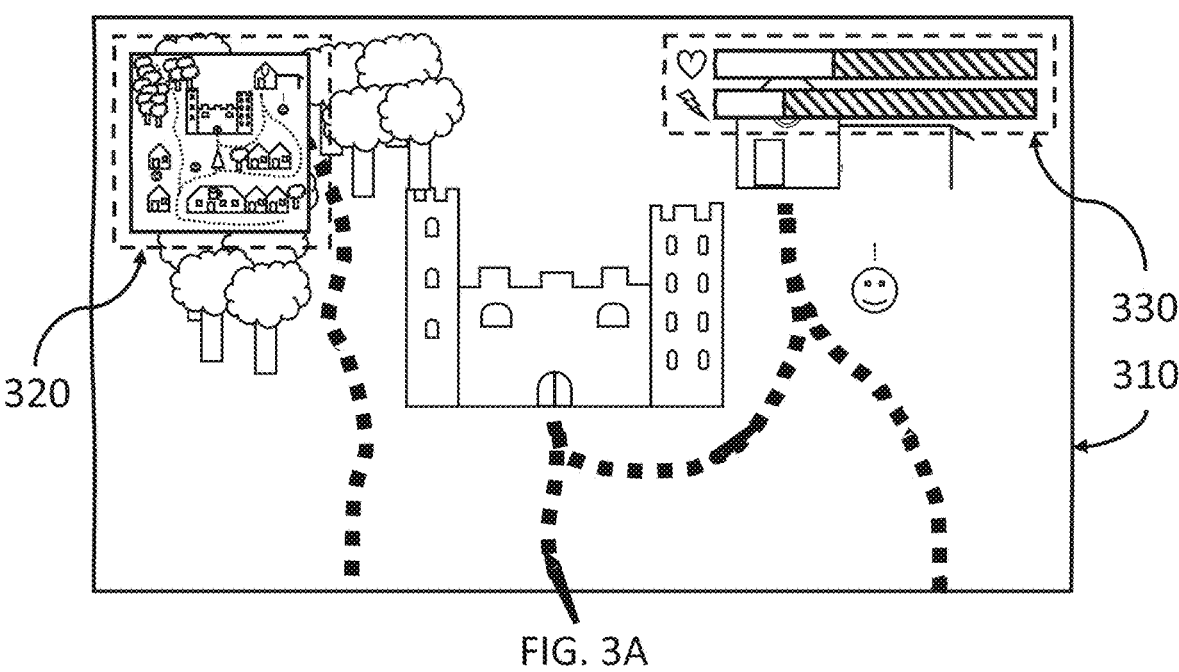
FIGS. 3A, 3B and 3C illustrate an example of content and example outputs of components of the content.
Figures 3B, 3C:
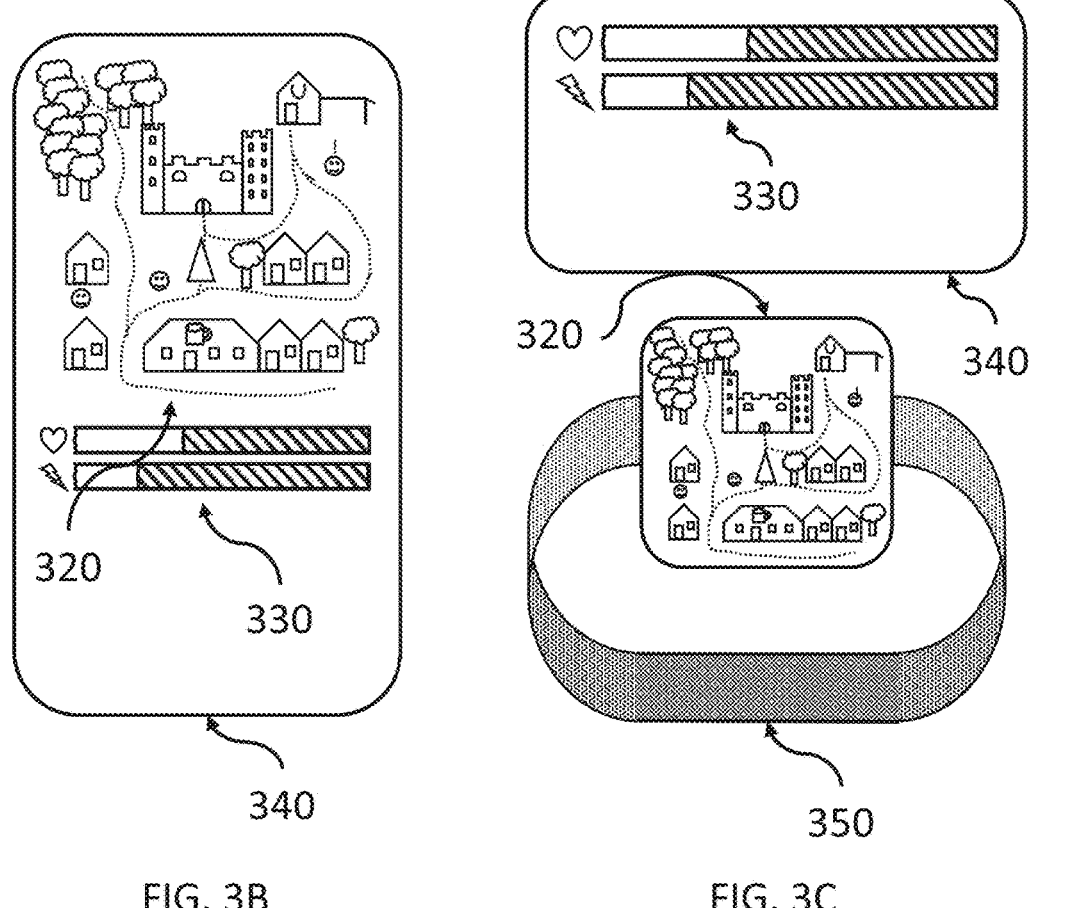

An example of the above methods will now be discussed with reference to FIGS. 3A, 3B and 3C. FIG. 3A illustrates an example of content 310 that may be used with embodiments of the present disclosure. Meanwhile, FIGS. 3B and 3C illustrate devices 340, 350 that may be used with embodiments of the present disclosure.

The content 310 may be output for display (e.g. on a television) by a primary device such as the entertainment system 10. The primary device may be configured to detect the devices 340, 350, and one or more properties in relation to the devices 340, 350. In this example, the devices 340, 350 may be detected in dependence upon an association with a user for example. For example, the device 340 may be a smartphone associated with the user and the device 350 may be a smartwatch associated with the user.

The one or more detected properties may comprise, for example, the connection status of each of the devices 340, 350, a proximity of the user to each of the devices 340, 350, and one or more types of input controls present on one or more of the plurality of devices 340, 350. For example, the primary device may attempt to connect to each of the devices 340, 350 to detect the connection status of each of the devices 340, 350.

Meanwhile, the primary device may use an imaging sensor to detect the position of the user and, optionally, each of the devices 340, 350 to determine the proximity of each of the devices 340, 350 to the user. The primary device may also receive positional data from one or more of the devices 340, 350, which may be generated by a sensor, such as a GPS sensor, on a respective device, in order to detect a proximity of one or more of the devices 340, 350 to the user.

It should be noted that other properties may also be detected in relation to the devices 340, 350, as discussed elsewhere herein.

In the example of FIG. 3B, the primary device 10 may detect that there is a connection available to device 340, but is unable to establish a connection to the device 350. Accordingly, the primary device 10 may, in dependence upon the detected connection status of each of the devices 340, 350, identify a subset of the devices 340, 350, where the subset would comprise the device 340 but not the device 350 in this example.

Alternatively, the primary device 10 may detect that there is a connection available to both devices 340, 350, but that the device 340 is within a predetermined distance from the user whilst the device 350 is not within the predetermined distance. Accordingly, the primary device 10 may, in dependence upon the detected proximity of the user to each of the devices 340, 350, identify a subset of the devices 340, 350, where the subset would comprise the device 340 but not the device 350 in this example.

The primary device 10 may identify a set of one or more components of the content 310 in dependence upon the subset of devices. In the example of FIG. 3B, the primary device may identify minimap 320 and status bars 330 as a component of the content 310. It should be noted that the minimap 320 and the status bars 330 may form a single component of the content even though they are not continuous within the content (i.e. the component may comprise both the minimap 320 and the status bars 330 even when the regions within the content occupied by each of the minimap 320 and the status bars 330 are not connected to each other).

The primary device 10 may transmit the component comprising the minimap 320 and the status bars 330 to the device 340 for output by the device 340. Meanwhile, the primary device 10 may continue to output the content 310. It should be noted that in some examples, the primary device 10 may output the content 310 without outputting the minimap 320 and the status bars 330 as these may be output by the device 340. However, in other examples, the primary device may output the content including the minimap 320 and the status bars 330, even though the minimap 320 and the status bars 330 are output by the device 340.

Therefore, in some embodiments, the method may further comprise a step of outputting 260 the content at a primary device of the plurality of devices, in which the steps of identifying 240 a set of one or more components of content in dependence upon a subset of the devices and transmitting 250 a respective component of the set of identified components to a respective device of the subset of the devices for output by the respective device are performed by the primary device. As noted elsewhere herein, the primary device may be entertainment device 10 (or more generally a content source device), which itself may not have an integral display capability but is associated with a primary display such as a television.

It should also be noted that the minimap 320 provides an example of either an interactive or non-interactive UI element. In some cases, the minimap 320 may be interactive and may, for example, place a waypoint in response to a user input. For example, the user may touch a location on the minimap 320 to place a waypoint on the minimap 320 when the minimap 320 is displayed by the device 340. However, the minimap 320 may also be non-interactive and may only be responsive to the content 310.

In some cases, when the minimap 320 is output by the primary device 310, it may be a non-interactive UI element but, when the minimap 320 is transmitted to a device 340 for output by the device 340, the one or more input controls present on the device 340 may enable the minimap 320 to change into an interactive UI element when the minimap 320 is output by the device 340. For example, the primary device 10 may detect a property of the device 340 that indicates that the device 340 comprises a touchscreen as an input control type. Therefore, in response to this detection, the primary device 10 may identify a UI element that requires a touchscreen as an input control type, such as the minimap 320, as a component of the content 310. The primary device 10 may also modify an interactivity level of the minimap 320 to enable the minimap 320 to be controlled by a touchscreen, and transmit the minimap 320 to the device 340 for output by the device 340.

Moving to the example of FIG. 3C, in this example, the primary device 10 may detect that both the devices 340, 350 are connected and within a predetermined distance to the user. The primary device 10 may identify a subset of devices that comprises both devices 340, 350, and may identify a set of components in dependence upon the identified subset of devices. It should be noted that, whilst only devices 340, 350 are shown in FIG. 3C, other devices may also be detected by the primary device 10 and also form the plurality of devices along with devices 340, 350.

In some cases, the primary device may be transmitting a set of one or more components of the content 310 to a subset of devices comprising the device 340 but not the device 350, as the primary device 10 may have detected that the device 350 is not within a predetermined distance from the user for example. However, the primary device 10 may detect a change to the proximity of the device 350 to the user, and that the device 350 has moved to within a predetermined distance from the user. In response to the detected change to the proximity of the device 350 to the user, the primary device 10 may identify another subset of devices comprising the device 340 and the device 350, and may identify a second set of components in dependence upon the other subset of devices.

For example, the primary device may identify the minimap 320 as a component for output by the device 350 in dependence upon, for example, the display resolution of the device 350 and the shape of the minimap, as the minimap may be square in shape whilst the display resolution of the device 350 may indicate that the shape of the display on the device 350 is also square in shape. Similarly, the primary device 10 may identify the status bars 330 as a component for output by the device 340 in dependence upon, for example, a user preference indicating that the user wants the status bars 330 to be displayed by the device 340.

The primary device 10 may transmit the component comprising the minimap 320 to the device 350 for output by the device 350, and may transmit the component comprising the status bars 330 to the device 340 for output by the device 340.

It should be noted that whilst the majority of the above description provides example of components being identified from image data, it should be noted that components may also be identified from audio data, or a combination of audio and image data.

For example, in a case where the content is a video game comprising audio data and image data, one or more image components of a set of components of the video game may be identified from the image data, whilst one or more audio components of the set of components of the video game may be identified from the audio data. Example audio components may include the background music of the video game, dialogue audio, sound effect audio, or one or more types of sound effect audio (e.g. the sounds of a horse's hooves may be one type of sound effect audio and the sound of gunfire may be another type). Additionally, a component may comprise both audio and image data. For instance, if a device comprises hardware that is able to output image data and hardware that is able to output audio data, a component comprising both audio and image data may be identified for, and transmitted to, the device.

Figure 4:
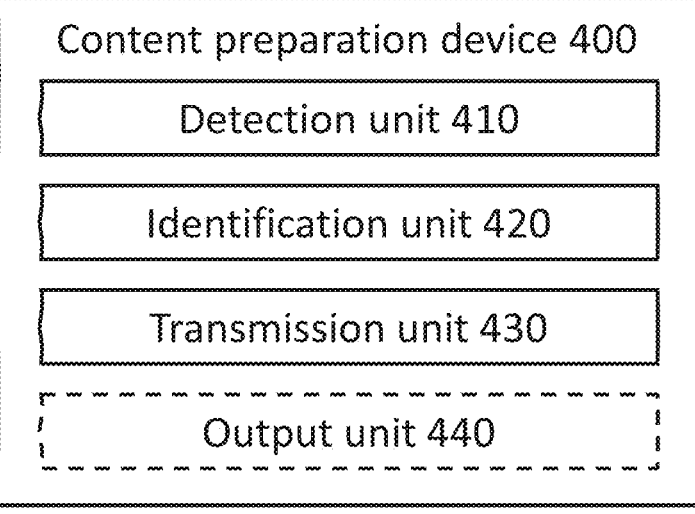
FIG. 4 schematically illustrates an example content preparation device.

Turning now to FIG. 4, a content preparation device 400 is provided. The content preparation device 400 comprises a detection unit 410 that is configured to detect a plurality of devices associated with a user; the detection unit 410 is configured to detect one or more properties in relation to the plurality of devices; an identification unit 420 that is configured to identify a first subset of the plurality of devices in dependence upon one or more of the detected properties, in which a subset of the plurality of devices comprises one or more devices from the plurality of devices; the identification unit 420 is configured to identify a first set of one or more components of content in dependence upon the first subset of the devices; and a transmission unit 430 that is configured a respective component of the first set of identified components to a respective device of the first subset of the devices for output by the respective device.

Optionally, in some embodiments, the content preparation device 400 may comprise an output unit 440 that is configured to out the content.

In some embodiments of the present disclosure, a computer program is provided. The computer program comprising computer executable instructions adapted to cause a computer system to perform any of the methods described elsewhere herein.

It will be appreciated that the above methods may be carried out on conventional hardware (such as the content preparation device 400) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for preparing content, the method comprising:

detecting a plurality of devices;

detecting one or more properties in relation to the plurality of devices;

identifying a first subset of the plurality of devices in dependence upon one or more of the detected properties, in which a subset of the plurality of devices comprises one or more devices from the plurality of devices;

identifying a first set of one or more components of content in dependence upon the first subset of the devices, wherein the first set of one or more components comprises a user interface element;

transmitting the user interface element to a respective device of the first subset of the devices for output by the respective device; and detecting a change to one or more of the detected properties; and in response to detecting the change to one or more of the detected properties, identifying a second subset of the devices in dependence upon one or more of the changed properties, and identifying a second set of one or more components in dependence upon the identified second subset of the devices, and transmitting a respective component of the second set of identified components to a respective device of the second subset of the devices for output by the respective device.

2. The method according to claim 1, in which the step of identifying the first set of components comprises:

identifying a plurality of subsets of the plurality of devices;

identifying a plurality of sets of one or more components of the content in dependence upon the plurality of subsets of the devices, in which a respective set of the plurality of sets of components is identified in dependence upon a respective subset of the plurality of subsets of the devices, in which the respective set of components corresponds to the respective subset of the devices; and identifying the first subset of the devices from the plurality of subsets of the devices in dependence upon one or more of the detected properties, and identifying, from the plurality of sets of components, the first set of components corresponding to the identified first subset of the devices.

3. The method according to claim 1, in which the one or more detected properties comprise one or more:

i) a connection status of one or more of the plurality of devices;

ii) one or more user preferences identifying one or more of the plurality of devices;

iii) a proximity of the user to one or more of the plurality of devices;

iv) a screen size of one or more of the plurality of devices;

v) a display resolution of one or more of the plurality of devices;

vi) one or more types of input controls present on one or more of the plurality of devices;

vii) a gaze direction of the user;

viii) a field of view of the user; and ix) one or more types of output present on one or more of the plurality of devices.

4. The method according to claim 1, in which a respective component of a set of one or more components of content is identified in dependence upon one or more characteristics of a respective device of a corresponding subset of the devices.

5. The method according to claim 4, in which the one or more characteristics of a respective device comprise one or more of:

i) a screen size of the respective device;

ii) a display resolution of the respective device;

iii) a user preference identifying the respective device; and iv) one or more types of input controls present on the respective device.

6. The method according to claim 1, the method further comprising outputting the content at a primary device of the plurality of devices, in which the steps of identifying a set of one or more components of content in dependence upon a subset of the devices and transmitting a respective component of the set of identified components to a respective device of the subset of the devices for output by the respective device are performed by the primary device.

7. The method according to claim 1, in which a set of one or more components of the content are identified in dependence upon a corresponding subset of the devices and one or more characteristics of the content.

8. The method according to claim 7, in which the one or more characteristics of the content comprise one or more of:

i) a type of content;

ii) an interactivity level of one or more portions of the content; and iii) one or more input control types required by one or more portions of the content.

9. The method according to claim 1, in which components of the content further comprise one or more of:

i) one or more types of audio;

ii) one or more user notifications;

iii) one or more portions of textual information; and iv) one or more images.

10. The method according to claim 1, in which the method comprises:

receiving a user input identifying a third subset of the devices;

identifying a third set of components in dependence upon the identified third subset of the devices; and transmitting a respective component of the third set of identified components to a respective device of the third subset of the devices for output by the respective device.

11. The method according to claim 10, in which the user input identifies the third subset of the devices by identifying one or more devices from the plurality of devices, in which the third subset of the devices consists of the one or more devices identified by the user input.

12. A method for preparing content, the method comprising:

detecting a plurality of devices;

detecting one or more properties in relation to the plurality of devices;

identifying a first subset of the plurality of devices in dependence upon one or more of the detected properties, in which a subset of the plurality of devices comprises one or more devices from the plurality of devices;

outputting the content at a primary device of the plurality of devices;

identifying, by the primary device, a first set of one or more components of content in dependence upon the first subset of the devices, wherein the first set of one or more components comprises a user interface element; and transmitting, by the primary device, the user interface element to a respective device of the first subset of the devices for output by the respective device.

13. The method according to claim 12, in which the step of identifying the first set of components comprises:

identifying a plurality of subsets of the plurality of devices;

identifying a plurality of sets of one or more components of the content in dependence upon the plurality of subsets of the devices, in which a respective set of the plurality of sets of components is identified in dependence upon a respective subset of the plurality of subsets of the devices, in which the respective set of components corresponds to the respective subset of the devices; and identifying the first subset of the devices from the plurality of subsets of the devices in dependence upon one or more of the detected properties, and identifying, from the plurality of sets of components, the first set of components corresponding to the identified first subset of the devices.

14. The method according to claim 12, in which the one or more detected properties comprise one or more:

i) a connection status of one or more of the plurality of devices;

ii) one or more user preferences identifying one or more of the plurality of devices;

iii) a proximity of the user to one or more of the plurality of devices;

iv) a screen size of one or more of the plurality of devices;

v) a display resolution of one or more of the plurality of devices;

vi) one or more types of input controls present on one or more of the plurality of devices;

vii) a gaze direction of the user;

viii) a field of view of the user; and ix) one or more types of output present on one or more of the plurality of devices.

15. A method for preparing content, the method comprising:

detecting a plurality of devices;

detecting one or more properties in relation to the plurality of devices;

identifying a first subset of the plurality of devices in dependence upon one or more of the detected properties, in which a subset of the plurality of devices comprises one or more devices from the plurality of devices;

identifying a first set of one or more components of content in dependence upon the first subset of the devices and one or more characteristics of the content, wherein the first set of one or more components comprises a user interface element, and wherein the one or more characteristics of the content comprise one or more of a type of content, an interactivity level of one or more portions of the content, and one or more input control types required by one or more portions of the content; and transmitting the user interface element to a respective device of the first subset of the devices for output by the respective device.

16. The method according to claim 15, in which the step of identifying the first set of components comprises:

identifying a plurality of subsets of the plurality of devices;

identifying a plurality of sets of one or more components of the content in dependence upon the plurality of subsets of the devices, in which a respective set of the plurality of sets of components is identified in dependence upon a respective subset of the plurality of subsets of the devices, in which the respective set of components corresponds to the respective subset of the devices; and identifying the first subset of the devices from the plurality of subsets of the devices in dependence upon one or more of the detected properties, and identifying, from the plurality of sets of components, the first set of components corresponding to the identified first subset of the devices.

17. The method according to claim 15, in which the one or more detected properties comprise one or more:

i) a connection status of one or more of the plurality of devices;

ii) one or more user preferences identifying one or more of the plurality of devices;

iii) a proximity of the user to one or more of the plurality of devices;

iv) a screen size of one or more of the plurality of devices;

v) a display resolution of one or more of the plurality of devices;

vi) one or more types of input controls present on one or more of the plurality of devices;

vii) a gaze direction of the user;

viii) a field of view of the user; and ix) one or more types of output present on one or more of the plurality of devices.

18. A method for preparing content, the method comprising:

detecting a plurality of devices;

detecting one or more properties in relation to the plurality of devices;

identifying a first subset of the plurality of devices in dependence upon one or more of the detected properties, in which a subset of the plurality of devices comprises one or more devices from the plurality of devices;

identifying a first set of one or more components of content in dependence upon the first subset of the devices, wherein the first set of one or more components comprises a user interface element;

transmitting the user interface element to a respective device of the first subset of the devices for output by the respective device;

receiving a user input identifying a further subset of the devices;

identifying a further set of components in dependence upon the identified further subset of the devices; and transmitting a respective component of the further set of identified components to a respective device of the further subset of the devices for output by the respective device.

19. The method according to claim 18, in which the step of identifying the first set of components comprises:

identifying a plurality of subsets of the plurality of devices;

identifying a plurality of sets of one or more components of the content in dependence upon the plurality of subsets of the devices, in which a respective set of the plurality of sets of components is identified in dependence upon a respective subset of the plurality of subsets of the devices, in which the respective set of components corresponds to the respective subset of the devices; and identifying the first subset of the devices from the plurality of subsets of the devices in dependence upon one or more of the detected properties, and identifying, from the plurality of sets of components, the first set of components corresponding to the identified first subset of the devices.

20. The method according to claim 18, in which the one or more detected properties comprise one or more:

i) a connection status of one or more of the plurality of devices;

ii) one or more user preferences identifying one or more of the plurality of devices;

iii) a proximity of the user to one or more of the plurality of devices;

iv) a screen size of one or more of the plurality of devices;

v) a display resolution of one or more of the plurality of devices;

vi) one or more types of input controls present on one or more of the plurality of devices;

vii) a gaze direction of the user;

viii) a field of view of the user; and ix) one or more types of output present on one or more of the plurality of devices.

* * * * *